(12) United States Patent
Hessmert et al.

(10) Patent No.: US 6,419,038 B1
(45) Date of Patent: Jul. 16, 2002

(54) DRIVE SLIP CONTROL SYSTEM

(75) Inventors: Ulrich Hessmert, Schwieberdingen; Thomas Sauter, Remseck, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/631,792

(22) Filed: Aug. 3, 2000

(30) Foreign Application Priority Data

Aug. 6, 1999 (DE) .......................... 199 37 157
Sep. 3, 1999 (DE) .......................... 199 46 905

(51) Int. Cl.$^7$ ................................ B60K 28/16
(52) U.S. Cl. .................. 180/197; 701/83; 701/84; 477/111; 303/139
(58) Field of Search ................ 180/197; 701/90, 701/82, 70, 83, 84, 85, 86; 477/111, 110, 107; 303/166, 167, 139

(56) References Cited

U.S. PATENT DOCUMENTS

| | | | | |
|---|---|---|---|---|
| 4,962,570 A | * | 10/1990 | Hosaka et al. | 180/197 X |
| 4,982,807 A | * | 1/1991 | Hilburger et al. | 180/197 |
| 5,405,301 A | * | 4/1995 | Yagi et al. | 180/197 X |
| 5,458,212 A | * | 10/1995 | Nishihara et al. | 180/197 X |
| 5,492,192 A | * | 2/1996 | Brooks et al. | 180/197 X |
| 5,519,617 A | * | 5/1996 | Hughes et al. | 180/197 X |
| 5,562,569 A | | 10/1996 | Franzke et al. | 477/110 |
| 5,628,378 A | * | 5/1997 | Saito et al. | 180/197 |
| 5,884,719 A | | 3/1999 | Schramm et al. | 180/197 |
| 5,971,089 A | * | 10/1999 | Sawada | 701/83 X |
| 6,059,064 A | * | 5/2000 | Nagano et al. | 180/243 |
| 6,089,677 A | * | 7/2000 | Fukumura et al. | 303/167 X |

* cited by examiner

Primary Examiner—Robert P. Olszewski
Assistant Examiner—F. Zeender
(74) Attorney, Agent, or Firm—Kenyon & Kenyon

(57) ABSTRACT

A drive slip control system in which, if a gearshift has been detected, at least one parameter of the drive slip controller is switched over so as to render the drive slip controller less sensitive.

21 Claims, 3 Drawing Sheets

DRIVE SLIP CONTROL SYSTEM

FIELD OF THE INVENTION

The present invention relates to a drive slip control system.

BACKGROUND INFORMATION

Many different types of drive slip control systems exist. In principle, in drive slip control systems, the slip of the driven wheel in question is determined based on the wheel speeds, particularly by comparing the wheel speed of the driven wheel in question with a reference value that is determined based on the wheel speed of at least one non-driven wheel. This is compared with a maximum permitted slip, slip-reducing intervention in the torque of the vehicle's drive unit and/or the wheel brake of the driven wheel in question being performed if the slip value of the driven wheel in question exceeds the maximum permitted slip threshold. A filter time used to filter the start of a slip control procedure, calculation of the slip threshold and/or the desired values transferred in order to control the torque of the drive unit and/or the amount of braking force applied to the spinning driven wheel by the control system are predefined or defined as a function of operating variables. A drive slip control system is described in, for example, German Patent Application 195 48 564 A1 (U.S. Pat. No. 5,884,719). German Patent Application 43 33 822 A1 (U.S. Pat. No. 5,562,569) describes a method of detecting a gearshift based on the engine speed and the wheel speed.

In certain applications, drive slip control systems may behave unsatisfactorily during a gearshift. This is because when the frictional connection between the engine and the drive train is reestablished following a gearshift, in particular an upshift, the driven wheels undergo a phase of high slip. This may cause the drive slip control system to be activated, which is disruptive, because it is associated with a short-term deterioration in traction. This effect may even be observed in cases where the coefficient of friction between the road and the tires is relatively high and in a normal situation the engine torque is not high enough to cause excess slip. Under special operating conditions during a gearshift, the excess slip is the result of additional power resulting from excessive engine speed, which must be reduced. Excessive slip occurs in particular when the engine speed is too high compared to the speed of the driven wheels. This arises in particular when the gearshift is performed too quickly and this is accompanied by an excessively slow drop in the engine speed or if the driver revs the engine before frictional connection is reestablished. The closure limitation functions of an engine control system also contribute to this, as they tend to cause the engine speed to drop slowly.

An object of the present invention is to provide a drive slip control system that displays improved characteristics during a gearshift.

SUMMARY

The above and other beneficial objects of the present invention are achieved by providing a drive slip control system that displays considerably improved characteristics during a gearshift. Through measures that can be taken either independently or in combination with one another, under this special operating state the drive slip control system is rendered less sensitive than when under normal operating conditions, so that short-term drops in traction can be eliminated or at least diminished. As a result, traction is improved significantly during a gearshift.

Advantageously, driving stability, which is also assisted by a drive slip control system, is still maintained in critical driving situations, even during a gearshift. This is because the measures that render the drive slip control system less sensitive are only carried out if the vehicle is not in a stability-critical operating situation, such as, for example, during cornering. If the vehicle is in a stability-critical operating situation of this kind, the at least one measure that renders the control system less sensitive is wholly or partially cancelled.

It is particularly advantageous that the control system is rendered less sensitive continuously so that the transition is smooth and not noticeable to the driver.

It is particularly advantageous that the method described below can be used with automatic as well as manual transmissions.

Further advantages are set forth in the description below of the exemplary embodiments.

BRIEF DESCRIPTION OF THE DRAWINGS

The present invention will be described in greater detail below with reference to the embodiments shown in the drawings, wherein.

DETAILED DESCRIPTION

Figure 1:
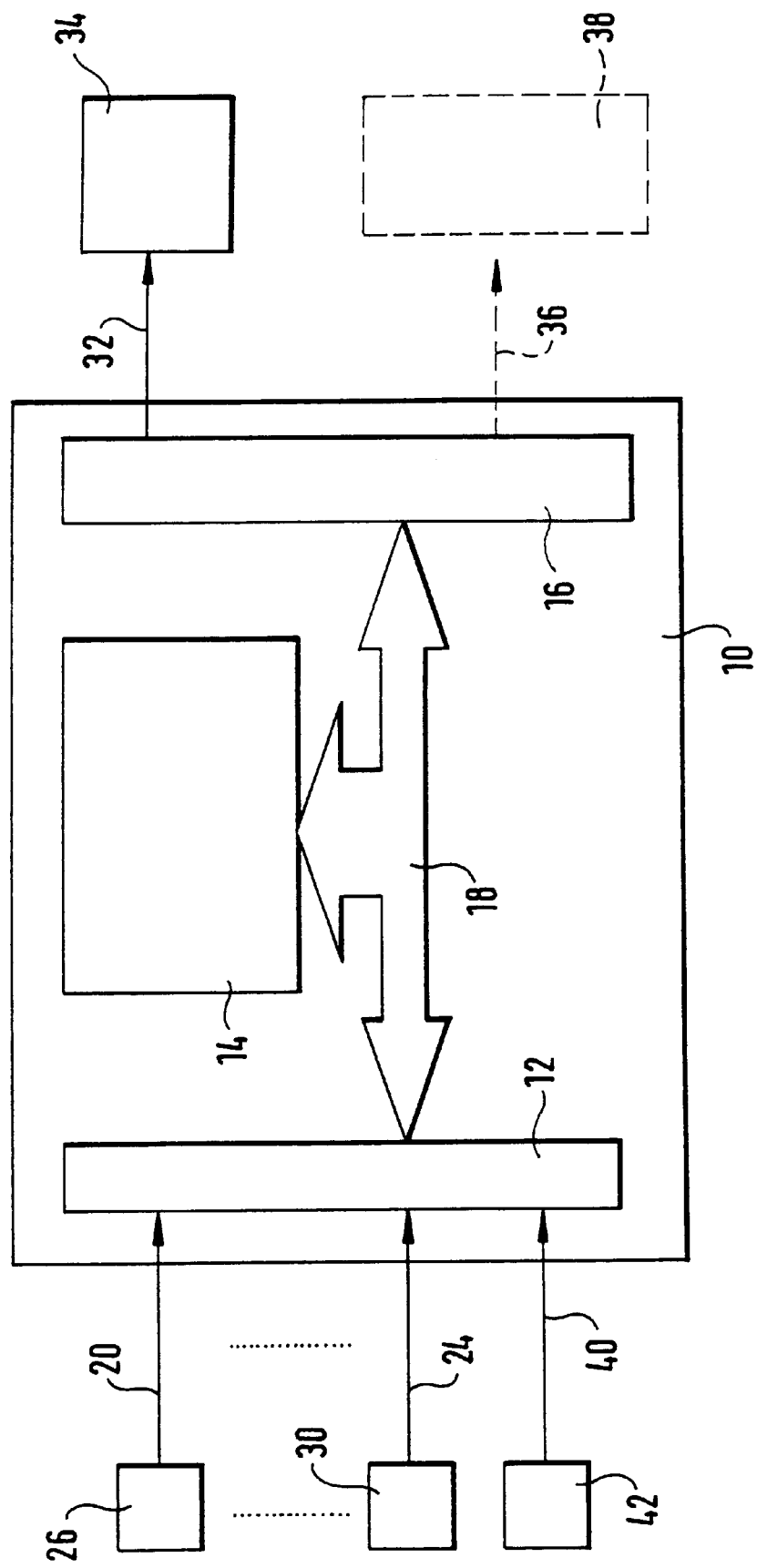
FIG. 1 is a schematic circuit diagram of a control device incorporating a drive slip control system of the present invention.

FIG. 1 shows a control unit 10, which includes at least one input circuit 12, at least one microcomputer 14 and at least one output circuit 16. These elements are connected to one another via a communication system 18 so that data can be exchanged back and forth. Input lines, via which signals—which represent operating variables or from which operating variables of the vehicle, the wheel brakes, the drive unit and the like can be derived—are sent, are connected to input circuit 12. For reasons of clarity, FIG. 1 shows only the input lines via which signals used to carry out the method described below are sent. Thus, signals that represent the wheel speeds are sent via input lines 20 to 24. These signals are generated in measuring devices 26 to 30 on each of the vehicle's wheels. Furthermore, in one embodiment, an input line 40 is provided. Input line 40 receives information as to whether a gearshift is in progress from a control unit used to control an automatic transmission 42. However, this information can also be determined in other ways, in particular without additional information from a transmission control unit, for example from the behavior of the engine speed and the output speed. Control unit 10 outputs manipulated variables as part of drive slip control as calculated by control unit 10 via output circuit 16 and the output lines connected thereto. Preferably, the at least one output line 32 is connected to an actuator 34 which can be actuated electrically and which influences the torque or the vehicle's power output. Preferably, this is an electronic engine control system that controls the torque of the vehicle's drive unit by influencing the air supply, the fuel supply and/or the ignition angle. An electrically controllable brake system 38 of the vehicle is preferably controlled via at least one further output lines 36 as part of the drive slip control and is used to control the braking force applied to the spinning drive wheel(s).

The functioning of a drive slip control system is known to a person skilled in the art. Therefore, this is only outlined below. The drive slip of each of the vehicle's driven wheels is determined based on the wheel speeds. This is then compared to a variable desired slip value, which if necessary is dependent on operating variables, and if the wheel slip exceeds the desired value at least at one driven wheel an intervention in the engine and/or brake of the drive wheel in question is carried out so as to reduce the wheel slip. If necessary, a filter time is provided before the slip-reducing measures are performed to allow the wheel slip to exceed the desired slip for a short time without causing the reducing measures to be performed, so that short-term disruptions in the signal characteristics do not trigger the drive slip control system. During normal operation, this filter time is considerably shorter than the duration of a gearshift. The amount by which the torque of the vehicle's drive unit is reduced if a tendency to spin arises (non-permitted slip) and/or the speed at which this is accomplished and/or the corresponding parameters for application of braking force to the spinning driven wheel are based on the wheel slip in question or are increased until the non-permitted wheel slip has ceased.

Depending on the operating circumstances, this drive slip controller is designed for improved vehicle traction or improved stability. If improved vehicle traction, in particular in the moving-off range, is desired, the desired slip value is set to a higher value. At higher speeds and/or when the vehicle is cornering and/or in similar driving situations that jeopardize stability, emphasis is placed on improving the vehicle's stability and the desired slip is lowered correspondingly.

In addition, other types of drive slip control are known in which, for example, on the basis of predefined performance data, control values for reducing the torque of the drive unit and/or increasing the braking force applied to the driven wheel are selected based on the wheel speeds and if necessary the changes therein. The method described below can also be used in the case of such drive slip controllers.

As described above, in the case of certain applications, a drive slip controller may behave unsatisfactorily during a gearshift, particularly during an upshift, where the ratio of the engine speed to the output speed is smaller after the gearshift has been performed. As the frictional connection between the engine and the drive train is reestablished, under this operating state the driven wheels often undergo a phase of excessive slip, which can cause the drive slip controller to intervene. The resulting reduction in torque and/or increase in braking force results in a short-term deterioration in traction, which is disruptive.

Figure 2:
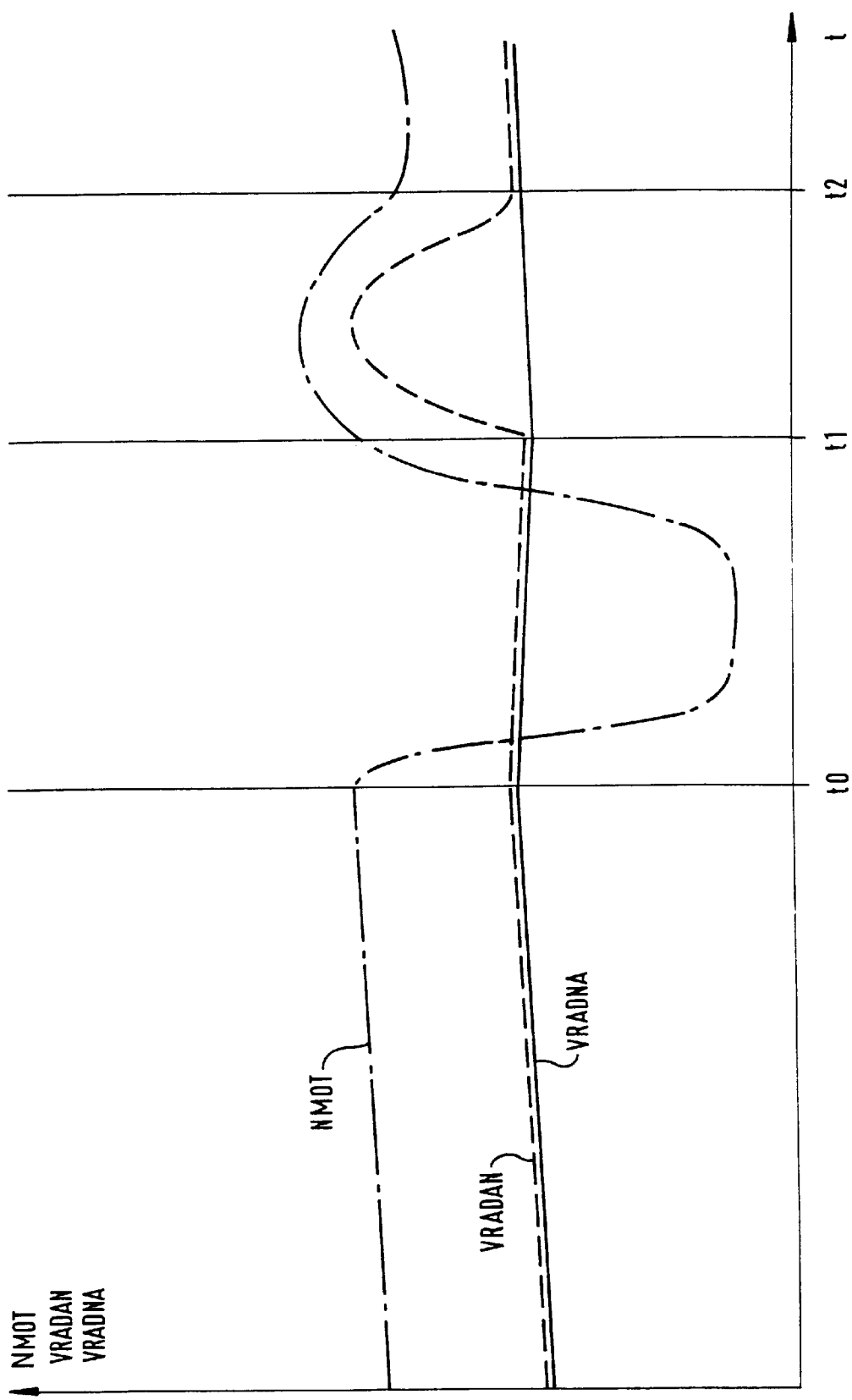
FIG. 2 is a chart illustrating a typical characteristic curve for engine speed values during a gearshift, plotted against time.

FIG. 2 shows a chart illustrating a typical characteristic curve of the relevant operating variables during and after a gearshift, plotted against time. The dot-dash curve indicates engine speed NMOT as plotted against time; the broken curve indicates the wheel speed of a driven wheel VRADAN; and the continuous line indicates the wheel speed of a non-driven wheel VRADNA over time. Up to time T0, the ratio of the engine speed to the speed signals is constant and is predefined by the gear that has been engaged. At time T0, a gearshift is initiated. In the example shown, this is an upshift. Initially, this causes the engine speed to drop rapidly due to the fact that the frictional connection has been broken and causes a slower decrease in the wheel speeds (due to the vehicle's inertia). The frictional connection in the drive train remains broken until time T1. Thus, the engine speed and the wheel speeds change independently of one another, the engine speed being set by the driver and/or by the transmission control system. At time T1, the frictional connection is reestablished in the new gear. At this point in time, the engine speed is increased. It may occur that, as shown in FIG. 2, the engine speed may be much higher than the synchronized rotational speed of the new gear. Ultimately, this results in excess engine speed and thus excess drive torque when the frictional connection is reestablished. Accordingly, the speed of the driven wheel increases as of time T1, and thus deviates from the speed of the non-driven wheel. This deviation may be so great that the slip of the driven wheel determined on this basis exceeds the permitted threshold, thereby causing the drive slip control system to intervene. At time T2, the engine speed has fallen to the synchronized rotational speed of the new gear. The gearshift is thus completed. The slip of the driven wheel decreases again in accordance with the reduction in engine speed. From time T2, the frictional connection has been reestablished and the operating state is such that the engine speed and the wheel speeds change based on a constant ratio relative to one another.

In order to avoid or at least diminish short-term loss of traction during a gearshift, in particular as the frictional connection between the engine and the drive train is being reestablished, the measures described below are provided in connection with the drive slip controller and may be used individually or in any desired combination. These measures have the following in common: the drive slip controller is rendered less sensitive so that during the gearshift it does not react to non-permitted slip or at least reacts later thereto. Therefore, greater slip values are permitted at the driven wheels, the drive slip controller intervenes later, or the extent to which the controller intervenes in the engine torque and/or braking force is reduced. The measures in detail are as follows: the filter time for the start of controlling by the drive slip control system is increased compared to normal operation; the desired slip is increased above the value for normal operation; the amount by which the torque is lowered is reduced and/or the speed at which it is lowered is reduced, i.e., the desired value transmitted is higher than that for a comparable slip situation during normal operation and/or limits are placed on changes and/or corresponding measures are taken in conjunction with increasing the braking force.

If a gearshift has been detected, these measures are preferably carried out for a predefined period of time, which in the normal instance is of an order so that the entire gearshift up until the time when the frictional connection is reestablished and the engine speed coincides with the new synchronized rotational speed is covered.

Preferably, in order to modify at least one variable so as to render the controller less sensitive, a filter function that allows a continuous transition from the normal value to the gearshift value is used. Alternatively, the values are switched over.

Preferably, if the operating state is stability-critical (e.g., the vehicle is cornering), the measure(s) described for reducing the sensitivity of the drive slip controller during a gearshift are not provided or are not performed to the full extent, i.e., they are performed using smaller values. Thus, the measure(s) described may be only fully effective when the vehicle is traveling forwards in a straight line in a non-stability-critical situation.

Preferably, the measure(s) can be used in conjunction with an automatic as well as a manual transmission.

A gearshift is detected, for example, by sending a corresponding signal from a transmission control system via the measures described above, or by making a comparison of the engine speed/wheel speed ratio, a gearshift being detected if this ratio departs from the value assigned to a gear.

Figure 3:
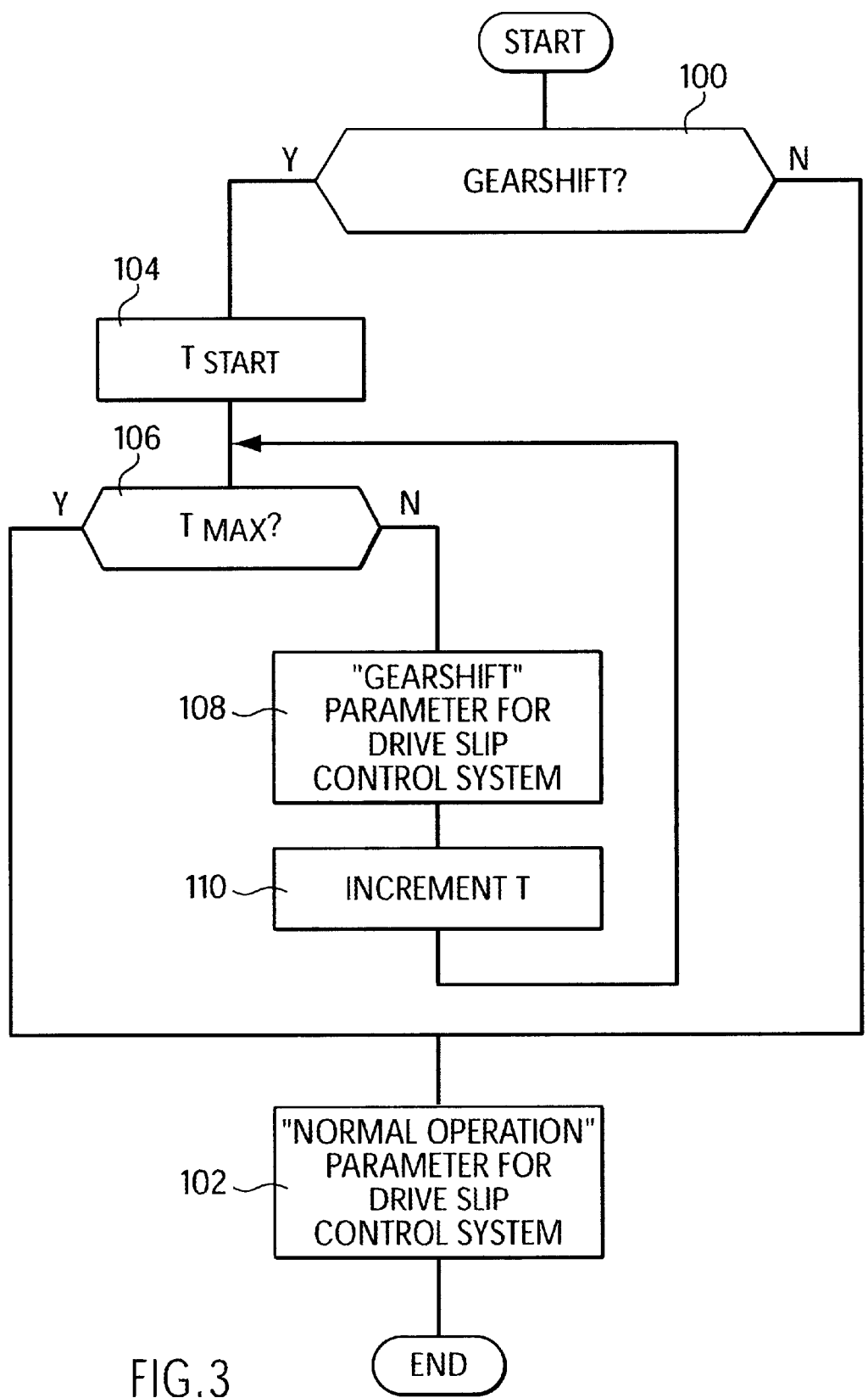
FIG. 3 is a flow chart illustrating a program implementing a method used to influence the drive slip control system during a gearshift.

The method described above is preferably implemented in the form of a program of microcomputer 14. The flow chart shown in FIG. 3 illustrates one example. This program is run at predefined points in time.

After the program has started, in first step 100 the signal sent by the transmission control system or other variables, such as the engine speed or wheel speed are used to determine whether a gearshift is being performed. If not, in step 102, the at least one variable parameter of the drive slip controller is set so as to reflect normal operation. The at least one parameter is the filter time for the start of drive slip control and/or the calculation of the permitted slip threshold and/or the magnitude of the desired value and/or the speed of change at which the internal combustion engine's torque is reduced and/or the magnitude or speed of application of the braking force applied to the spinning wheel. After step 102, the program is ended and run again at the next point in time.

If in step 100 a gearshift has been detected, in step 104 a counter T, the counter status of which is compared with a maximum value in step 106, is started. If maximum value Tmax has been reached, step 102 is performed, and the gearshift phase is considered complete. If the end of the time period since the gearshift was detected as defined by the maximum value has not yet been reached, in step 108 the at least one variable parameter of the drive slip controller is set so as to reflect the fact that the vehicle is in the gearshift operating state. The filter time is increased and/or the slip threshold value is increased and/or the desired value based on which the engine torque is reduced is weighted using a factor that increases the desired value and thus causes the engine torque to be reduced by less and/or changing of the desired value or torque is limited to a predefined value and/or the control signal for application of braking force is manipulated based on the desired value. After step 108, counter T is incremented in step 110, and the program continues with step 106.

Preferably, there is also a step that only permits the special measures during a gearshift if the operating state is non-stability-critical, such as, for example, when the vehicle is traveling in a straight line.

Preferably, only shifts involving an upshift are taken into account, i.e., a gearshift procedure in which the ratio of the engine speed to the wheel speed becomes smaller. Alternatively, the method described is implemented for gearshifts in both directions.

The measures described for making improvements during a gearshift are performed individually or in any desired combination. That is, either just one of the aforementioned variable parameters or any desired combination of those parameters are modified in the event of a gearshift.

The method described above can be used in connection with gasoline or diesel internal combustion engines or alternative drives such as electric motors or fuel-cell drives, and in conjunction with hydraulic, pneumatic, electro-hydraulic, electro-pneumatic or electromechanical wheel brakes.

What is claimed is:

1. A drive slip control system for a vehicle having a drive unit driving at least one driven wheel, the drive slip control system comprising:

a drive slip controller, the drive slip controller configured to perform a drive slip control operation when a non-permitted slip occurs and when a spinning of a driven wheel occurs, the drive slip control operation including at least one of reducing a torque of the drive unit for the at least one driven wheel and applying a braking force at the spinning driven wheel, the drive slip controller configured to change a value of at least one parameter to render the drive slip controller less sensitive when a gearshift has been detected so that during the gearshift at least one of the following occurs: the drive slip controller does not react to non-permitted slip; the drive slip controller reacts later to non-permitted slip; reducing the amount by which the torque is lowered; and reducing the applied brake force.

2. The drive slip control system according to claim 1, wherein the drive slip controller is configured to be rendered less sensitive only when the vehicle is not in a stability-critical operating state.

3. The drive slip control system according to claim 2, wherein the stability-critical operating state includes a cornering state.

4. The drive slip control system according to claim 1, wherein the drive slip controller is rendered less sensitive by increasing a filter time for the drive unit for a start of the drive slip control operation.

5. The drive slip control system according to claim 1, wherein the drive slip controller is switched over as a distinct stage to render the drive slip controller less sensitive.

6. The drive slip control system according to claim 1, wherein the drive slip controller is switched over continuously to render the drive slip controller less sensitive.

7. The drive slip control system according to claim 1, wherein the drive slip controller is rendered less sensitive for a predetermined period of time after the gearshift has been detected.

8. The drive slip control system according to claim 7, wherein the drive slip controller is switched back to a normal operation after the predetermined period of time has elapsed.

9. The drive slip control system according to claim 1, wherein the reducing of the torque of the drive unit is slowed when the drive slip controller is rendered less sensitive.

10. The drive slip control system according to claim 1, wherein the applying of the braking force is slowed when the drive slip controller is rendered less sensitive.

11. The drive slip control system according to claim 1, wherein the drive unit includes an internal combustion engine.

12. The drive slip control system according to claim 11, wherein the internal combustion engine includes a gasoline internal combustion engine.

13. The drive slip control system according to claim 11, wherein the internal combustion engine includes a diesel internal combustion engine.

14. The drive slip control system according to claim 1, wherein the drive unit includes an alternative-fuel drive unit.

15. The drive slip control system according to claim 14, wherein the drive unit includes an electric motor.

16. The drive slip control system according to claim 14, wherein the drive unit includes a fuel-cell drive unit.

17. The drive slip control system according to claim 1, wherein the wheel brake includes one of a hydraulic, a pneumatic, an electro-hydraulic, an electro-pneumatic and an electromechanical wheel brake.

18. A drive slip control system for a vehicle having a drive unit driving at least one driven wheel, the drive slip control system comprising:

a drive slip controller, the drive slip controller configured to perform a drive slip control operation when a non-permitted slip occurs and when a spinning of a driven wheel occurs, the drive slip control operation including at least one of reducing a torque of the drive unit for at least one driven wheel and applying a braking force at the spinning driven wheel, the drive slip controller configured to change a value of at least one parameter to render the drive slip controller less sensitive when a gearshift has been detected, wherein the drive slip control operation is performed when a permitted slip value is exceeded, the drive slip controller being rendered less sensitive by increasing the permitted slip value.

19. A drive slip control system for a vehicle having a drive unit driving at least one driven wheel, the drive slip control system comprising:

a drive slip controller, the drive slip controller configured to perform a drive slip control operation when a non-permitted slip occurs and when a spinning of a driven wheel occurs, the drive slip control operation including at least one of reducing a torque of the drive unit for at least one driven wheel and applying a braking force at the spinning driven wheel, the drive slip controller configured to change a value of at least one parameter to render the drive slip controller less sensitive when a gearshift has been detected, wherein the drive slip controller is configured to reduce the torque of the drive unit as a function of a control signal, the drive slip controller being rendered less sensitive by influencing the control signal.

20. A drive slip control system for a vehicle having a drive unit driving at least one driven wheel, the drive slip control system comprising:

a drive slip controller, the drive slip controller configured to perform a drive slip control operation when a non-permitted slip occurs and when a spinning of a driven wheel occurs, the drive slip control operation including at least one of reducing a torque of the drive unit for at least one driven wheel and applying a braking force at the spinning driven wheel, the drive slip controller configured to change a value of at least one parameter to render the drive slip controller less sensitive when a gearshift has been detected, wherein the drive slip controller is configured to reduce the braking force applied as a function of a control signal, the drive slip controller being rendered less sensitive by influencing the control signal.

21. A drive slip control system for a vehicle having a drive unit driving at least one driven wheel, the drive slip control system comprising:

a drive slip controller, the drive slip controller configured to perform a drive slip control operation when a non-permitted slip occurs and when a spinning of a driven wheel occurs, the drive slip control operation including at least one of reducing a torque of the drive unit for at least one driven wheel and applying a braking force at the spinning driven wheel, the drive slip controller configured to change a value of at least one parameter to render the drive slip controller less sensitive when a gearshift has been detected, wherein the drive slip controller is rendered less sensitive for a predetermined period of time after the gearshift has been detected, wherein the predetermined period of time corresponds to a time period beginning when a frictional connection between the drive unit and the driven wheels is broken and ending when a speed of the drive unit coincides with a rate of revolution of a new gear.

* * * * *